US012597228B1

(12) United States Patent (10) Patent No.: US 12,597,228 B1

Carroll et al. (45) Date of Patent: Apr. 7, 2026

(54) TEXTILE MATCHING USING COLOR AND PATTERN RECOGNITION AND METHODS OF USE

(71) Applicant: MYDIMODA, INC., The Colony, TX (US)

(72) Inventors: Terrence A. Carroll, The Colony, TX (US); Peter Hussami, Debrecen (HU); András Kalecz-Simon, Budapest (HU); Bin Jin, Tumen (CN)

(73) Assignee: MYDIMODA, INC., The Colony, TX (US)

( * ) Notice: Subject to any disclaimer, the term of this patent is extended or adjusted under 35 U.S.C. 154(b) by 248 days.

(21) Appl. No.: 17/897,192

(22) Filed: Aug. 28, 2022

Related U.S. Application Data

(63) Continuation of application No. 16/664,864, filed on Oct. 27, 2019, now Pat. No. 11,462,001, which is a continuation of application No. 15/523,935, filed as application No. PCT/CN2014/090176 on Nov. 3, 2014, now Pat. No. 10,460,199.

(51) Int. Cl.

| | |
|---|---|
| *G06V 10/75* | (2022.01) |
| *G06F 16/58* | (2019.01) |
| *G06F 16/583* | (2019.01) |
| *G06F 16/60* | (2019.01) |
| *G06F 16/63* | (2019.01) |
| *G06F 18/2415* | (2023.01) |
| *G06Q 30/0601* | (2023.01) |
| *G06T 7/90* | (2017.01) |
| *G06V 10/22* | (2022.01) |
| *G06T 7/11* | (2017.01) |

(52) U.S. Cl.
CPC ............ *G06V 10/751* (2022.01); *G06F 16/58* (2019.01); *G06F 16/583* (2019.01); *G06F 16/5838* (2019.01); *G06F 16/60* (2019.01); *G06F 16/63* (2019.01); *G06F 18/24155* (2023.01); *G06Q 30/0631* (2013.01); *G06T 7/90* (2017.01); *G06V 10/235* (2022.01); *G06Q 30/0643* (2013.01); *G06T 7/11* (2017.01); *G06T 2200/24* (2013.01); *G06T 2207/10024* (2013.01); *G06T 2207/20021* (2013.01); *G06T 2207/30196* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 10,096,127 B2 * | 10/2018 | Li | ..................... | G06F 18/24155 |
| 10,460,199 B2 * | 10/2019 | Carroll | ...................... | G06T 7/90 |
| 2003/0149675 A1 * | 8/2003 | Ansari | ............... | H04N 21/4751 706/2 |

(Continued)

*Primary Examiner* — Randolph I Chu

(74) *Attorney, Agent, or Firm* — Franklin & Associates International Inc; Matthew F. Lambrinos

(57) ABSTRACT

Textile matching using color and pattern recognition and methods of use are provided herein. An example method includes analyzing an image of a first article of clothing to obtain color information and pattern information, comparing the color information and pattern information of the first article of clothing to color information and pattern information for a plurality of other articles of clothing using Bayesian probability analysis to determine matched pairs, and providing a user with wardrobe suggestions using the matched pairs.

20 Claims, 8 Drawing Sheets

(56)          References Cited

U.S. PATENT DOCUMENTS

| | | | | |
|---|---|---|---|---|
| 2005/0018140 A1* | 1/2005 | Ishizaki | ................ | G06F 1/1605 |
| | | | | 353/28 |
| 2008/0082426 A1* | 4/2008 | Gokturk | ............. | G06F 16/5838 |
| | | | | 707/E17.014 |
| 2009/0037295 A1* | 2/2009 | Saul | ........................ | G06N 3/02 |
| | | | | 382/209 |
| 2012/0265774 A1* | 10/2012 | Saul | ................... | G06Q 30/0641 |
| | | | | 707/754 |
| 2016/0026926 A1* | 1/2016 | Yeung | .................... | G06N 20/00 |
| | | | | 706/12 |
| 2016/0027088 A1* | 1/2016 | Jensen | ............. | G06Q 30/0631 |
| | | | | 705/26.7 |
| 2022/0366476 A1* | 11/2022 | Penner | ............. | G06Q 30/0631 |

* cited by examiner

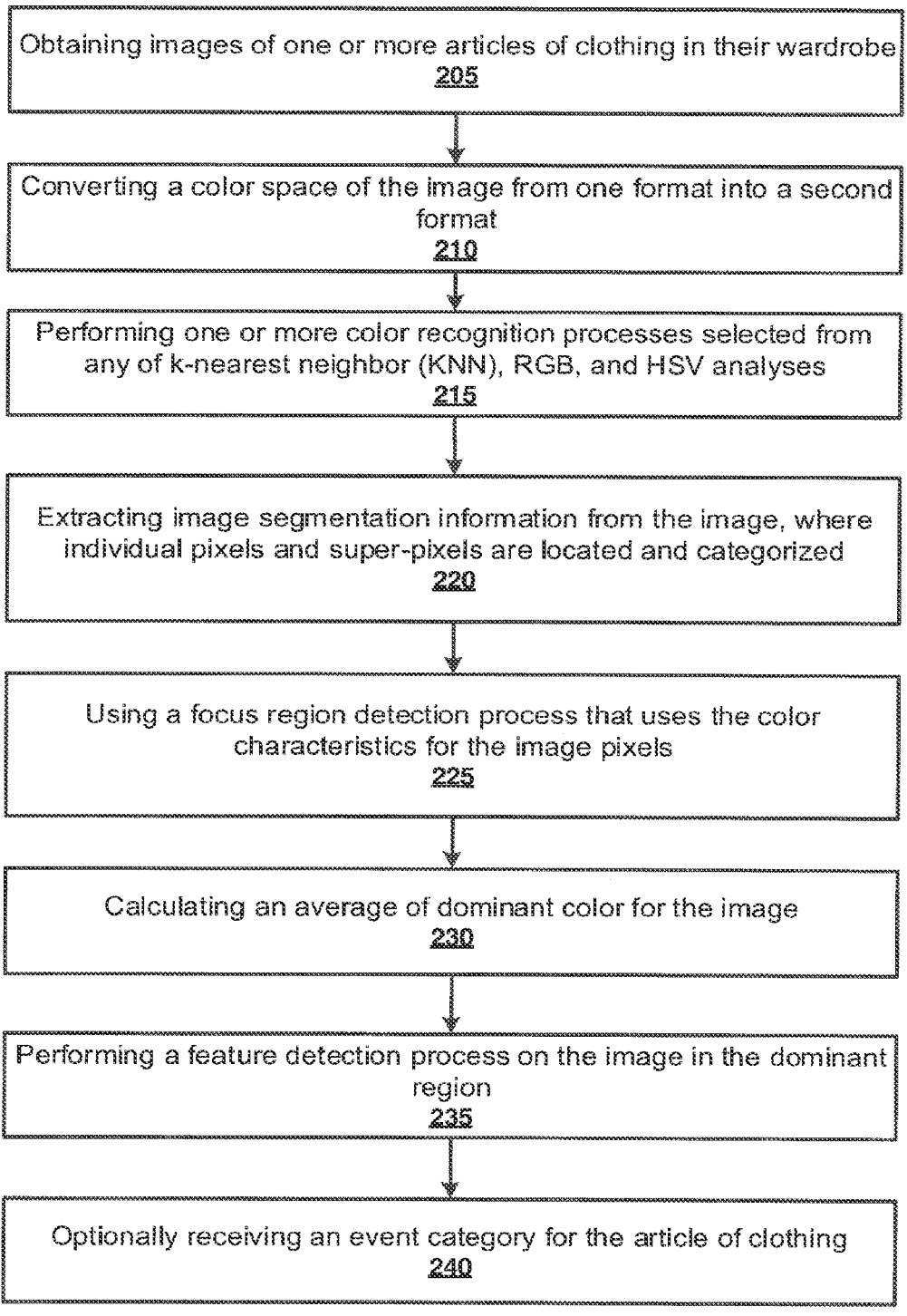

Obtaining images of one or more articles of clothing in their wardrobe
205

Converting a color space of the image from one format into a second format
210

Performing one or more color recognition processes selected from any of k-nearest neighbor (KNN), RGB, and HSV analyses
215

Extracting image segmentation information from the image, where individual pixels and super-pixels are located and categorized
220

Using a focus region detection process that uses the color characteristics for the image pixels
225

Calculating an average of dominant color for the image
230

Performing a feature detection process on the image in the dominant region
235

Optionally receiving an event category for the article of clothing
240

FIG. 2

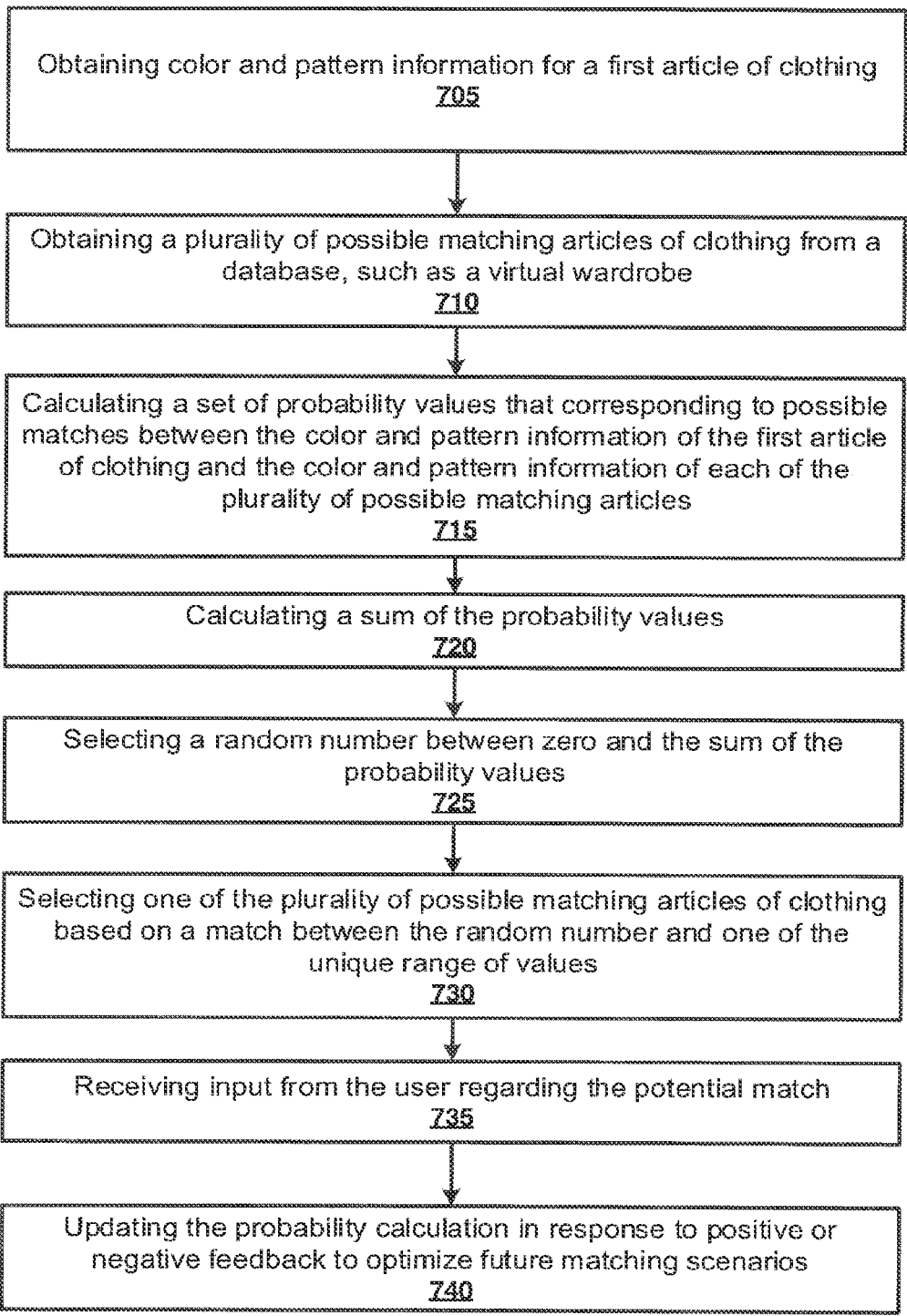

Obtaining color and pattern information for a first article of clothing
705

Obtaining a plurality of possible matching articles of clothing from a
database, such as a virtual wardrobe
710

Calculating a set of probability values that corresponding to possible
matches between the color and pattern information of the first article
of clothing and the color and pattern information of each of the
plurality of possible matching articles
715

Calculating a sum of the probability values
720

Selecting a random number between zero and the sum of the
probability values
725

Selecting one of the plurality of possible matching articles of clothing
based on a match between the random number and one of the
unique range of values
730

Receiving input from the user regarding the potential match
735

Updating the probability calculation in response to positive or
negative feedback to optimize future matching scenarios
740

*FIG. 7*

TEXTILE MATCHING USING COLOR AND PATTERN RECOGNITION AND METHODS OF USE

CROSS-REFERENCE TO RELATED APPLICATIONS

The present application is a U.S. Non-Provisional patent application Ser. No. 16/664,864, filed Oct. 27, 2019, which is a continuation of U.S. Non-Provisional patent application Ser. No. 15/523,935, filed May 2, 2017, now U.S. Pat. No. 10,460,199 issued on Oct. 29, 2019, which is a US National Stage under 35 U.S.C 371 of International Patent Application No. PCT/CN2014/090176, filed Nov. 3, 2014, the entire contents of which are incorporated herein by reference for continuity of disclosure.

BACKGROUND

1. Technical Field

Embodiments relate to color and pattern matching methods and systems, and more particularly, to color and pattern recognition methods that employ statistical analyses in order to match textiles, and specifically articles of clothing.

BRIEF SUMMARY

According to some embodiments, the present technology is directed to a method, comprising: (a) analyzing an image of a first article of clothing to obtain color information and pattern information; (b) locating a second article of clothing for pairing with the first article of clothing by: (i) obtaining a plurality of possible matching articles of clothing from a database, each for the plurality of possible matching articles comprising color and pattern information; (ii) calculating a set of probability values, the set of probability values corresponding to possible matches between the color and pattern information of the first article of clothing and the color and pattern information of each of the plurality of possible matching articles, the set of probability values each having a unique range of values measured in increments from a first of the set of probability values to a last of the set of probability values; (iii) calculating a sum of the probability values; (iv) selecting a random number between zero and the sum of the probability values; (v) selecting one of the plurality of possible matching articles of clothing based on a match between the random number and one of the unique range of values; and (c) displaying the one of the plurality of possible matching articles of clothing to the user.

According to other embodiments, the present technology is directed to a method, comprising: (a) providing a virtual wardrobe comprising articles of clothing, each of the articles of clothing comprising color information and pattern information; (b) analyzing an image of an article of clothing for purchase, to obtain color information and pattern information for the article of clothing for purchase; (c) identifying at least one color and pattern match between the color information and pattern information for the article of clothing for purchase and the color information and pattern information of each of the articles of clothing, so as to create a matched pair of articles of clothing; (d) receiving an indication that the article of clothing for purchase has been purchased; and (e) adding the article of clothing for purchase to the virtual wardrobe.

According to yet other embodiments, the present technology is directed to a method, comprising: (a) analyzing an image of a first article of clothing to obtain color information and pattern information; (b) comparing the color information and pattern information of the first article of clothing to color information and pattern information for a plurality of other articles of clothing using Bayesian probability analysis to determine matched pairs; and (c) providing a user with wardrobe suggestions using the matched pairs.

In some embodiments, the present technology can utilize the Bayesian probability analysis learning algorithm irrespective of the calculation of color and/or pattern information. That is, the learning algorithm described herein can be utilized in processes that do not require color and/or pattern information. Also, some embodiments can utilize color information independently from pattern/texture information, and vice-versa.

In one embodiment, the present technology is directed to a method that includes: (a) receiving feedback from a user in response to the selection of the a possible matching article of the plurality of possible matching articles of clothing; (b) if the feedback is positive, calculating an updated probability using: $(P_{PRIOR}*P_{GOOD})/(P_{PRIOR}*P_{GOOD}+ (1-P_{PRIOR})*(1-P_{BAD})$ Where $P_{PRIOR}$ is a current probability for a possible matching article, and $P_{GOOD}$ and $P_{BAD}$ are both selected between 0.5 and 1; (c) the updated probability indicating that the possible matching article is more likely to be selected in a future pairing than the possible matching article with the current probability.

In additional embodiments, the present technology is directed to a method of (a) receiving feedback from a user in response to the selection of the a possible matching article of the plurality of possible matching articles of clothing; (b) if the feedback is positive, calculating an updated probability using: $1-((1-P_{PRIOR}*P_{BAD})*P_{BAD})/(1-P_{PRIOR})*P_{BAD}+ P_{PRIOR}*(1-P_{GOOD})$ where $P_{PRIOR}$ is a current probability for a possible matching article, and $P_{GOOD}$ and $P_{BAD}$ are both selected between 0.5 and 1; (c) selecting a second or more of the plurality of possible matching articles of clothing based on a match between the random number and one of the unique range of values; and (d) providing the second or more of the plurality of possible matching articles.

BRIEF DESCRIPTION OF THE DRAWINGS

FIG. 2 is a flowchart of a method for color and pattern information analysis;

FIG. 7 is a flowchart of a method for calculating probable matches of articles of clothing and incorporating feedback.

DETAILED DESCRIPTION OF PREFERRED EMBODIMENTS

In the following description of the best mode of implementation, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Generally speaking, the present technology is directed to methods for matching textile products, and specifically articles of clothing in order to provide various benefits. For context, the terms "article of clothing" should be construed broadly to include, for example, shirts, blouses, pants, shoes, outerwear (e.g., jackets and coats), jewelry, as well as other items or articles that would be worn by the user and which have both a color and pattern.

The present technology can be used to match articles of clothing together in pairs or grouped into outfits that are matched according to a statistical analysis of color and pattern information. In some embodiments, the present technology uses Bayesian algorithms to find matches, coupled with a user feedback loop to enable the Bayesian algorithms to improve over time.

In one embodiment, the present technology can leverage knowledge of a virtual wardrobe created for a user. For example, the user can take pictures of articles of clothing they own. The present technology can match together these articles of clothing by performing color and pattern analyses on the images of the articles of clothing. The color and pattern analyses are coupled with one or more statistical analyses methods to create suitable matches for the user.

In another example, a color and pattern analysis can be performed for an article of clothing that is for purchase. Thus, prior to purchasing the article of clothing, the user can know whether there is something in their wardrobe that will match. In some instances, the present technology can be used to scan and compare an inventory of a supplier against a virtual wardrobe of a user and suggest possible matches, referred to as recommendations that are available for purchase.

In one embodiment, the present technology generates possible matches and/or outfits that are suitable for an event category. For example, the user can request matching articles of clothing for an event category, such as formal, after view casual, casual, and so forth.

These and other advantages of the present technology are provided below with reference to the collective drawings.

Figure 1:
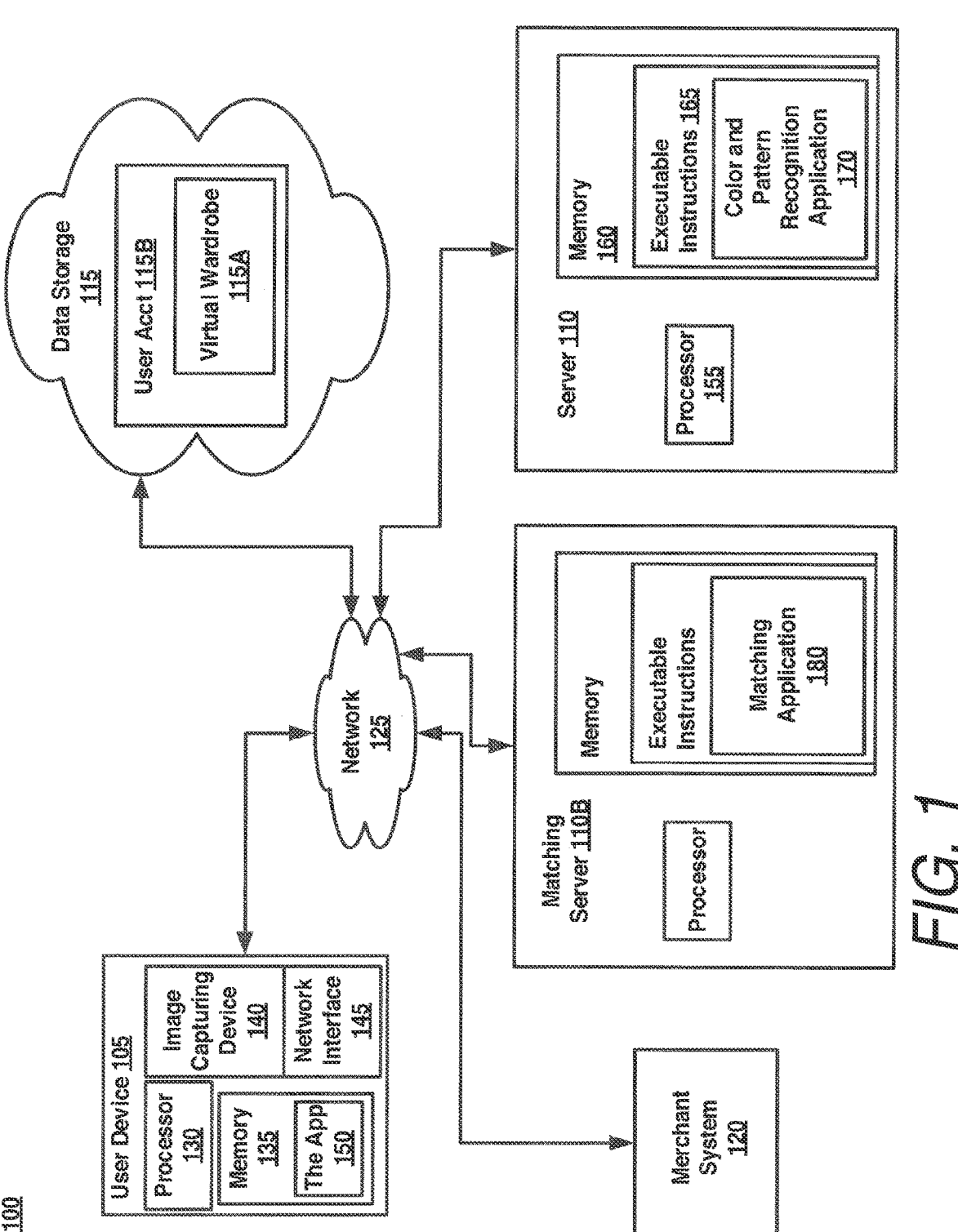
FIG. 1 is a schematic diagram of a computing environment for practicing aspects of the present technology.
Figure 8:
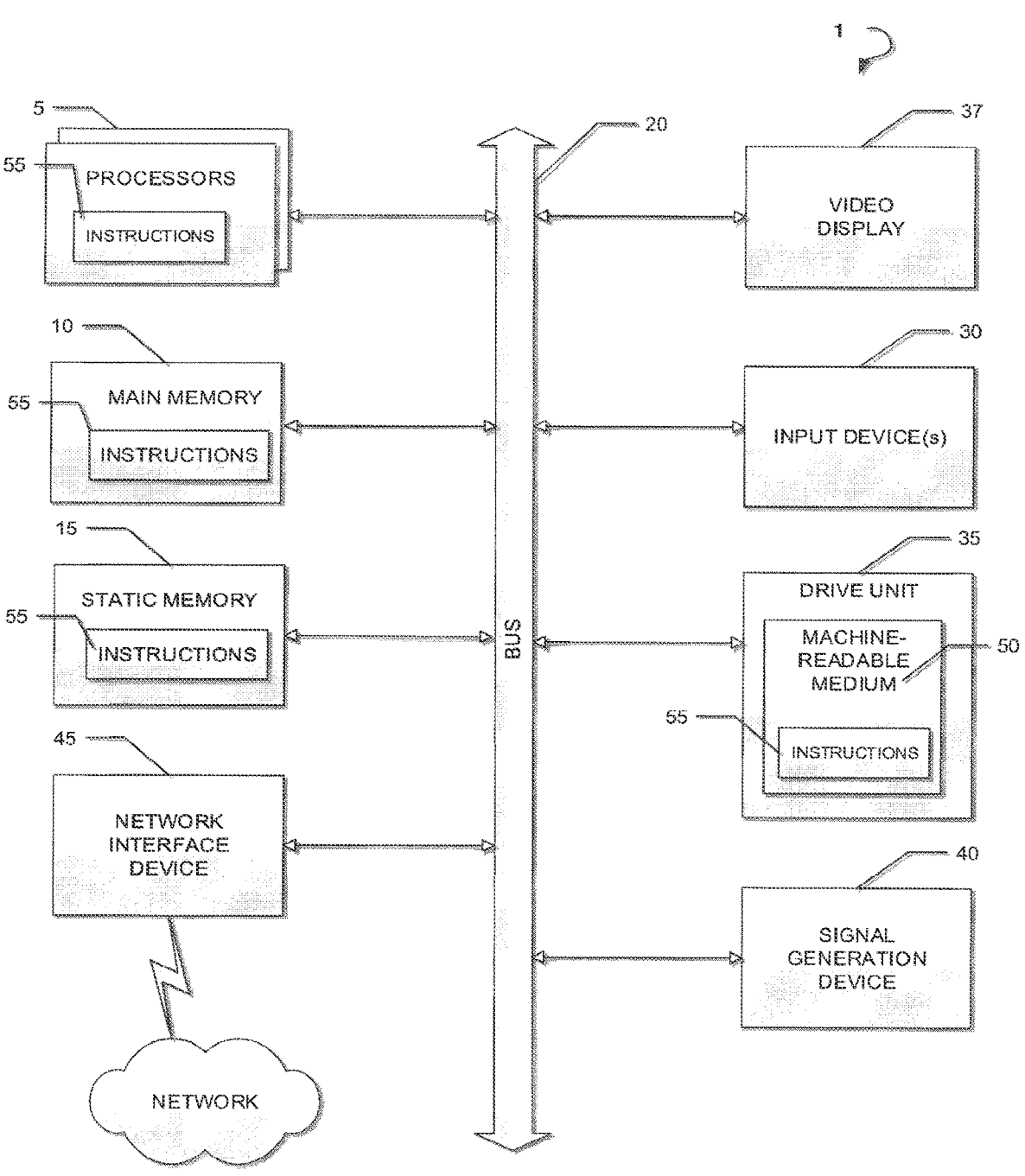
FIG. 8 illustrates an exemplary computing device that may be used to implement an embodiment of the present technology.

Turning to FIG. 1 which is a schematic diagram of a computing environment for practicing aspects of the present technology. The environment 100 generally comprises user devices, such as user device 105, server 110, data storage 115, merchant system 120, and network 125. In addition to the specific purpose computing elements and algorithms described below, each of the computing devices of the environment 100 may utilize features of a computing system or machine illustrated in FIG. 8 and described in greater detail below. It will be understood that some of the computing elements of the environment 100 can be combined together, such as the server 110 and the data storage 115.

Components of the environment 100 such as the server 110 and data storage 115 may be implemented in a web server or cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the server 110 and data storage 115 may each include a distributed group of computing devices such as web servers that do not share computing resources or workload.

In one embodiment, the data storage 115 can store information indicative of a virtual wardrobe 115A for the end user. The data storage 115 can also store user profiles or account information (user account 115B) for users. For example, the user will capture images of one or more articles of clothing in their physical wardrobe. Prior to matching, the server 110 can consult the data storage 115 and perform a color and pattern analysis on each article of clothing. Once the virtual wardrobe is established, a matching analysis can occur, either matching the articles of clothing in the virtual wardrobe or matching a new article (e.g., for sale) of clothing with the articles of clothing in the virtual wardrobe.

End users may access and interact with the environment via an end user computing device such as user device 105. For purposes of clarity, user device 105 is an end user computing device such as a mobile communications device, a laptop, a computer, or any other computing device that would be known to one of ordinary skill in the art. Only the components of user device 105 will be described in greater detail.

For context, user device 105 can be used by an end user to obtain images of one or more articles of clothing. The user device 105 presents the end user with matched options and receives feedback from the end user.

The user device 105 comprises a processor 130, memory 135, an image capturing device 140, and network interface 145. The processor 130 is configured to execute instructions that are stored in the memory 135. In one embodiment, the memory 135 is a non-transitory computer readable medium that stores a color and pattern matching application, hereinafter referred to as "the app 150". Generally, the app 150, when executed by the processor 130 will allow the user device 105 to perform methods in accordance with the present technology. For example, a method includes obtaining images of an article of clothing and performing color matching and pattern matching analyses to obtain color and pattern information that is used by the server 110 (or the user device 105) to calculate matches (e.g., other articles of clothing in a virtual wardrobe) for the color and pattern information of the subject article of clothing.

The image capturing device 140 of the user device 105 may include one or more different types of devices that are configured to obtain a visual representation of an article of clothing, such as a camera or video camera. In one embodiment, the user device 105 is a Smartphone and the image capturing device 140 is a built-in camera of the Smartphone.

The server 110 may communicatively couple with the user device 105 via a network 125. The network 125 may include any one of a number of private and public communications mediums such as the Internet. Other suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 125 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The user device 105 can utilize the network using a network interface, such as the network interface 145.

The server 110 may generally include a processor 155 and memory 160. The processor 155 may execute various instructions stored in memory 160 in order to perform methods described herein. For example, the processor 155 may execute instructions 165 stored in memory 160 to provide the color and pattern matching features described herein. In one embodiment, the memory 160 comprises a matching application 170 that provides recommendations of paired articles of clothing using, for example, Bayesian algorithms.

In some embodiments, suppliers can create virtual wardrobes of inventory that can be used in suggesting articles of clothing for a shopper. For example, the user can provide the supplier with access to their virtual wardrobe. The server 110 can use the color and pattern matching processes described herein to match one or more articles of clothing in the inventory of supplier to one or more articles of clothing in the user's virtual wardrobe.

Methods executed by the server 110 may alternatively be executed solely by the user devices 105. Alternatively, the server 110 and user device 105 may cooperatively execute various portions of the methods described herein.

In one embodiment, the architecture 100 can comprise a second server (matching server 110B) that is used for executing Bayesian statistical calculations used in matching articles of clothing based on color and pattern information. The matching server 110B is constructed similarly to the server 110 with the exception that the matching server 110B is configured to execute Bayesian statistical calculations. Thus, the matching server 110B can execute a matching application 180 that provides these advantages.

The following examples contemplate methods occurring on the user device 105, when executing the app 150. For example, the app 150 provides a method of color and pattern recognition.

FIG. 2 is a flowchart of an example method for creating a virtual wardrobe, which includes therein a color and pattern recognition sub-method and a pattern recognition sub-method. In one embodiment, the method includes the end user obtaining 205 images of one or more articles of clothing in their wardrobe. For example, the end user uses a camera to obtain an image of each article of clothing.

The method further comprises the app 150 performing a color recognition sub-method on the image. The color recognition process comprises converting 210 a color space of the image from one format into a second format. For example, red, green, and blue (RGB) characteristics of the image are converted into hue, saturation, and value (HSV) components. In other examples, the RGB values can be converted into hue, saturation, and lightness (HSL), hue, saturation, and brightness (HSB), or cyan, magenta, yellow, and key/black values.

After the converting the color space of the image, the method comprises performing 215 color recognition processes selected from any of k-nearest neighbor (KNN), RGB, and HSV analyses. Also, the method comprises extracting 220 image segmentation information from the image, where individual pixels and super-pixels are located and categorized. For example, each pixel in the image can be classified as one of potentially 16 different kinds of colors.

It will be understood that in some embodiments, a color of the end user's skin is also captured in the image (or in a separate image) and is used in the color information calculation process.

The method can comprise using 225 a focus region detection process that uses the color characteristics for the image pixels. The focus regions are used in a process of calculating 230 an average of dominant color for the image. This average dominant color is referred to as "color information" for the article of clothing. Again, the color information sub-method can include additional or fewer steps than those specified in steps 205-230.

It will be understood that the server 110 can, in some embodiment, utilize color information independently from pattern/texture information, which is described in greater detail below. Also, the server 110 can also utilize pattern/texture information independently from color information. Thus, when evaluating an article of clothing to match it with other suitable articles of clothing in the virtual wardrobe, server 110 can use only color information or pattern/texture information. This can be advantageous when the color information is of nominal value, such as when the color information is highly neutral. The server 110 can use pattern/texture information as the dominant characteristic by which articles of clothing are matched. Likewise, when pattern/texture information is negligible, such as when an article of clothing is a monotone or solid, the server 110 can use color information as the dominant information type.

The next part of the process is the pattern recognition sub-method. Initially, the method comprises performing 235 a feature detection process on the image in the dominant region. For example, a feature detection process includes calculating an edge orientation field (such as a histogram of oriented gradients) using, for example, a Sobel operator in a dominant region of the image. To be sure, the dominant region is defined by location where a dominant color(s) is found on the image.

Using the feature detection information, the method includes performing 240 a strip and square image analysis. Finally, pattern information for the article of clothing is determined by performing a dot image and empty image analysis using the color information of step 230 and the feature detection information calculated in step 235.

Once the image and pattern information has been determined, the method can include receiving 240 an event category for the article of clothing. For example, the user can specify if the article of clothing is formal, business casual, after five casual, or any other similar category. It will be understood that the same article of clothing can be categorized into two different categories. For example, a pair of chino pants can be categorized as business casual and after five casual. Again, the pattern/texture information submethod can include additional or fewer steps than those specified in steps 205-230.

It will be understood that while the method of FIG. 2 has been described as being executed at the user device level, the method can also be executed on the server 110 with the user device 105 capturing images of articles of clothing and transmitting the same to the server 110 for analysis.

As mentioned above, the color and pattern matching methods of FIG. 2 can be used to create a virtual wardrobe with records for articles of clothing that comprise the color and pattern information described above. After color and pattern information has been obtained, various processes for using the color and pattern information such as probabilistic matching and suggestions/recommendations can be executed by the matching server 110B.

The matching server 110B is therefore, in some embodiments, configured to perform a Bayesian probability calculation that matches pairs of articles of clothing to one another and generates statistical values for each pair.

A pair consists of two fully qualified articles of clothing, for example, a white plain shirt and a red striped tie. The qualified nature of the articles of clothing refer to the defining of the article type such as shirt, tie, shoes, pants, overcoat, and so forth, as well as a color and pattern information as determined above.

These qualified items can be analyzed with respect to a certain setting (e.g., event criteria). The relationship between these two articles is described by a number P, such that $0<P<1$. The higher the number, the better these two items match with one another. This number alternatively can be interpreted as the probability that these two items match.

In one example, each article of clothing in a virtual wardrobe is selected and compared against every other article of clothing in the virtual wardrobe using color and pattern information, processed using a Bayesian algorithm.

In another example, the matching server 110B conducts an initial rule based analysis using general rules established in the matching server 110B. Thus, it will be understood that each possible pair has a value calculated by the matching server 110B. Initial values are provided based on domain-specific heuristics (e.g., "Do not wear black and brown together" or "If you are wearing different patterns, they should have a unifying color"). These initial values can be updated in accordance with user feedback, as described below.

The matching server 110B uses the initial values of the pairs to weight the probabilities that are calculated by the matching server 110B and utilized to recommend a certain pair of articles of clothing.

By way of example, an end user has selected a white plain shirt from their virtual wardrobe (or by capturing a picture of the shirt). The end user also specifies that they want to match the shirt with a tie from their virtual wardrobe (or locate a suitable tie for sale if no matching tie exists in their virtual wardrobe).

The matching server 110B is then executed to select a tie by comparing color and image information for the shirt against individual ties that each are defined by color and pattern information.

In this example, it is assumed that there are a plurality of ties in the virtual wardrobe, but these ties only have one of two colors (red, blue) and one of two patterns (striped and paisley).

Assume the following values for our example. The server can calculate an initial set of values for each pairing as described above so as to generate the following output: (1) white plain shirt-red striped tie: 0.8 (2) white plain shirt-red paisley tie: 0.4; (3) white plain shirt-blue striped tie: 0.2; and (4) white plain shirt-blue paisley tie: 0.5. These values are referred to as a set of probability values. These pairs are referred to as possible matches because the user has not selected or provided feedback on the pairs at this point in the process.

The matching server 110B will sum the values sum (1,2,3,4), =1.9. The matching server 110B then generates a random number between 0 and 1.9 (summed total of the probabilities). If the random number falls between 0 and 0.8, the matching server 110B recommends a red striped tie. If the random number falls between 0.8 and 1.2 the matching server 110B recommends a red paisley tie. If the random number falls between 1.2 and 1.4, the matching server 110B recommends recommend a blue striped tie. If the matching server 110B recommends if it falls between 1.4 and 1.9, we recommend a blue paisley tie.

Thus, the set of probability values each have a unique range of values measured in increments from a first of the set of probability values to a last of the set of probability values. In this example, the first of the set of probability values is 0.8 and the last of the set of probability values is 0.5. In this example a second of the set of probability values is 0.4 and a third of the set of probability values is 0.2. It will be understood that while four pairs have been described, fewer or additional possible matches are contemplated for use in accordance with the present technology.

The above method has a twofold advantage. In some cases the matching server 110B provides a recommendation that is fashionable based on current knowledge of the virtual wardrobe, the event criteria, and/or the end user's preferences or skin color.

However, combinations which are potentially less fashionable are not completely forgotten and sometimes offered by chance by the matching server 110B. This provides an opportunity to gain feedback and follow changes in fashion choices (i.e., when a previously less fashionable combination becomes in vogue).

Recommendations for the full attire are built on similar principles. If we have a shirt, the matching server 110B can locate a matching tie using the above method. However, to find a jacket for the shirt and the tie, the matching server 110B may alter/extend the methodology.

The matching server 110B will rely on possible probability values, however the matching server 110B will use these possible probability values to create a probability calculation value which describes the jacket in relation to the shirt-tie combo. In order to obtain this number, the matching server 110B takes the probability value for the shirt-jacket pair and multiplies it by the probability value calculated for the tie-jacket pair. In building an outfit, the matching server 110B uses these numbers as choice weights similarly as above.

In addition to matching, the matching server 110B can also be separately (or in combination) programmed to provide recommendations (e.g., matched articles of clothing) to a user.

In some embodiments, the matching server 110B uses Bayesian learning, which a machine learning tool that provides a consistent way to model and incorporate new information, such as a newly purchased article of clothing or an article of clothing that is for sale. The learning algorithm executed by the matching server 110B makes use of Bayesian updating.

An explanation of the algorithm used by the matching server 110B is explained in a simple context of choosing a pair (e.g. a tie for a given shirt), then extended to handle more complex combinations.

In order to use this algorithm, the matching server 110B is configured to calculate an expert estimate of two values that will be used throughout: $P_{GOOD}$ and $P_{BAD}$. $P_{GOOD}$ is a probability that if the matching server 110B present a "good" matching to the user, s/he will regard it as such, while $P_{BAD}$ provides an estimate of a probability that a user presented with a "bad" pair, s/he will identify it as such.

The matching server 110B is configured to receive two binary responses, either "Yes" or a "No" as an answer for a recommendation. The matching server 110B can update the Bayesian logic using both positive and negative feedback.

With regard to a positive "Yes" response, the matching server 110B will be more confident that the subject pair is a good match. Therefore, the matching server 110B may increase the value associated with this pair by applying the following Bayesian formula:

$$(P_{PRIOR}*P_{GOOD})/(P_{PRIOR}*P_{GOOD}+(1-P_{PRIOR})*(1-P_{BAD})) \qquad \text{[Equation 1]}$$

where $P_{PRIOR}$ is our previous value for the pair and $P_{UPDATED}$ is our new value for the pair. Also, $P_{PRIOR}$ is a current probability for a possible matching article, and $P_{GOOD}$ and $P_{BAD}$ are both selected between 0.5 and 1.

If the matching server 110B receives a negative or "No" response from a user in response to a possible pairing of two articles of clothing (or more), the matching server 110B can be more sure that possible match is a bad match. Thus, the matching server 110B will decrease the value associated with this pair by applying the Bayesian formula:

$$1-((1-P_{PRIOR}*P_{BAD})*P_{BAD})/(1-P_{PRIOR})*P_{BAD}+ \\ P_{PRIOR}*(1-P_{GOOD})) \qquad \text{[Equation 2]}$$

where $P_{PRIOR}$ is a current probability for a possible matching article, and $P_{GOOD}$ and $P_{BAD}$ are both selected between 0.5 and 1.

With regard to extending the algorithms for use when more than two articles of clothing are being compared, the matching server 110B applies an almost similar update method when choosing a third or a fourth article of clothing for an existing pair or triplet. The only significant change is that the matching server 110B may decrease the $P_{GOOD}$ and $P_{BAD}$ values, since it is a more complex task, so mistakes are more likely to be made.

The algorithms provided above (Equations 1 and 2) support two operational modes for the matching server 110B. In one embodiment, the matching server 110B allows users to build choices incrementally. In another embodiment, the matching server 110B allows users to receive a recommendation on a complete set of apparel.

It will be understood that the user's choice of Yes-No-N/A will affect not only how the matching server 110B learns and adapts, but future choices will be modified as well. In some embodiments, the matching server 110B can specify that article of clothing that was specified as No or N/A by the end user should not appear again in the current session.

The following pseudocode is an example implementation of the learning algorithm provided above, which implements Equations 1 and 2.

```
tables = ['shirt', 'trousers', 'tie', 'jacket'] default_order = [0, 1, 2, 3]
def update_individual_prob(p, val, p_good, p_bad):
    if val:
        top = p * p_good
        return (top / (top + (1 - p) * (1 - p_bad))
    top = (1 - p) * p_bad
    return (top / (top + p * (1 - p_good))
def update_prob(val, tblindex, correlations): update individual probs
#blocked: dict of lists, key apparel, value list of blocked id-s
def pick_first(dct, tblindex, blocked = { }):
    tbl = tables[tblindex]
    query = "select {0}_id, prob from {1} where {0}_id not in ({3})"
        order by color, pattern asc".format(
        tbl, table_name(tblindex), ','.join(str(x) for x in blocked[tbl]]))
    db.execute(query)
        rows = db.fetch( ) sm = sum(rows)
    rnd = rand(sm)
    elt = pick_element(rows, rnd)
    return elt
def pick1(dct, order, blocked = { }):
    #dct is key-value pairs, order is a permutation of set {0,1,2,3}
    #blocked is the set of blocked values
    if order empty or incorrect:
        order = default_order
        if len(dct) == 0:
            add_first(dct, order[0])
            return
    tbl = tables[order(len(dct))] #identify the table
    probs = [1 for _in all_color_pattern_combos]
    for k, v in det.items( ):
        query = "select {0}_id, prob from {1} where {2}_id={3} and {0}_ id not in i
            order by color, pattern src".format(
            tbl, table_combo_name(tbl, k), k, v, blocked[tbl])
```

-continued

```
    db.execute(query)
    rows = db.fetch( )
        [probs[i] *= rows[i] for i in range(len(rows))]
    #now have probs
    pick from probs as above -> will yield an element, which alone isn't blocke
also check tuple-blockings (2-3-4 tuples)
        return elt
    def main_logic(inpdct, order, mode, last_offer, response, blocked):
        update probabilities on (last_offer, response), and update blocked set
        if mode == incremental:
        newelt = pick1(inpdct, order, blocked)
        return newelt
    else:
        while len(inpdct) < 4:
            newelt = pick1(inpdct, order, blocked)
            inpdct[table_name[order(len(inpdct))]] = newelt
        return newelt
```

In one use case example, an end user provides a request to the matching server 110B to create a pairing or outfit for the end user from their virtual wardrobe. The end user is provided with a user interface (UI) that allows the user to enter or select an event criterion such as formal, after five casual, and so forth. The end user can also specify a number articles of clothing that need to be coordinate, as well as an article type for each of the articles. For example, the user can be provided with a UI that has icons that represent various types of articles such as shirt, tie, pants, shoes, jacket, and so forth.

The permutations of articles of clothing can be dictated by the matching server 110B applying the initial rules set. For example, on choice set is a shirt, trousers, tie, and jacket type combination that is suitable for a formal event. Another example is a shirt, trousers, and jacket type combination that is suitable for an after five casual event, or a shirt and trousers type combination for a casual event.

After the user specifies these items, the matching server 110B performs the Bayesian matching process on various articles of clothing found in the user's virtual wardrobe.

The matching server 110B then displays the possible matches to the user on a UI. The matching server 110B integrates the choices using Equation 1 and 2 as needed.

In addition to creating matches that are specifically for the user with regard to their personal virtual wardrobe, the matching server 110B can generate possible matches or recommendations using information gathered from other end users.

In another use case the end user captures an image of a shirt that they would like to wear and uses the matching server 110B to generate recommendations for the selected shirt. In this example, the matching server 110B locates possible matches for trousers, socks, ties, jackets, shoes, and so forth. The possible options can be presented to the user in a UI and the user can approve or disapprove the possible matches, with each instance of feedback updating the Bayesian algorithm to improve future recommendations.

In yet another example, the user, rather than taking an image of an article of clothing, can select an article of clothing online. The image is obtained, for example, from a catalog or content repository of a supplier's website. This article of clothing can be matched to other articles of clothing offered for sale or available in the user's virtual wardrobe. Again, the virtual wardrobe is indicative of the actual garments present in the user's physical wardrobe. Thus, the virtual wardrobe is a model of the physical wardrobe.

In an extension of this embodiment, the user can select the article of clothing, a price range, and/or a brand. The matching server 110B can then search merchant systems 120 for possible matching articles of clothing that are for sale.

Figure 3:
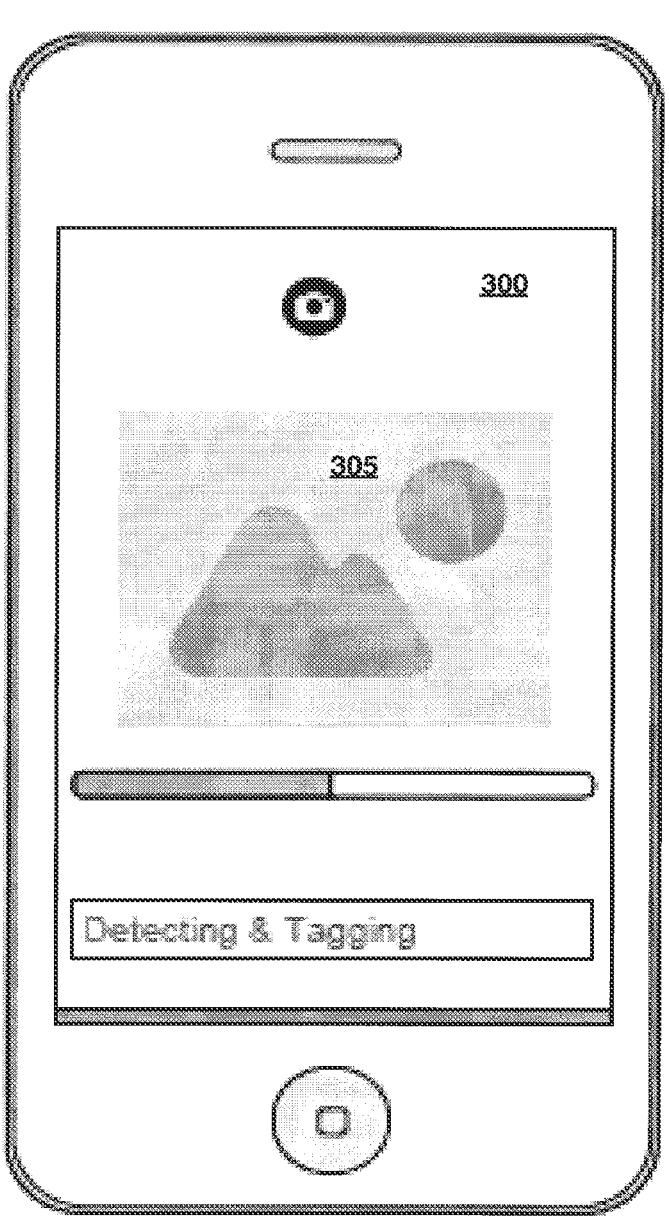
FIG. 3 illustrates a user interface that allows a user to capture, review, and upload an image of an article of clothing.
Figure 4:
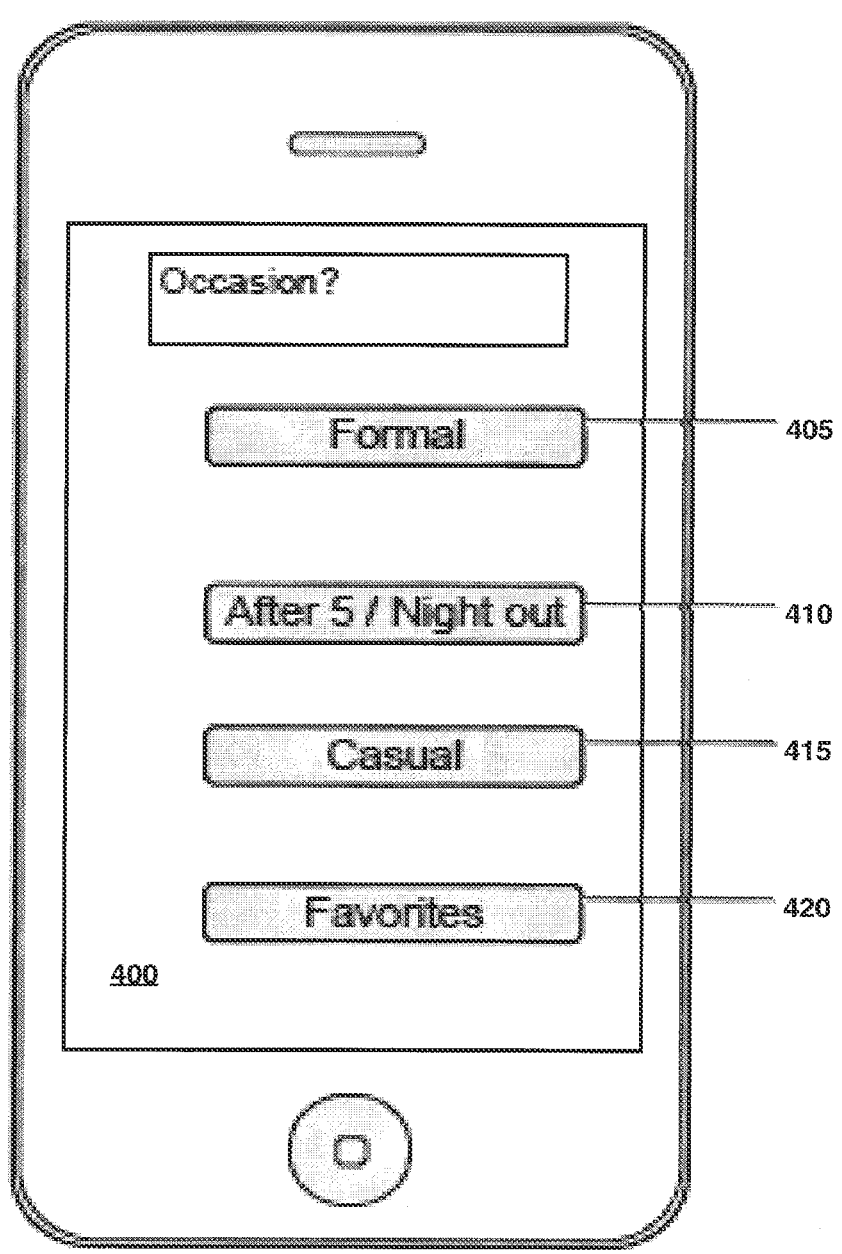
FIG. 4 illustrates a user interface that allows a user to select event criterion.
Figure 5:
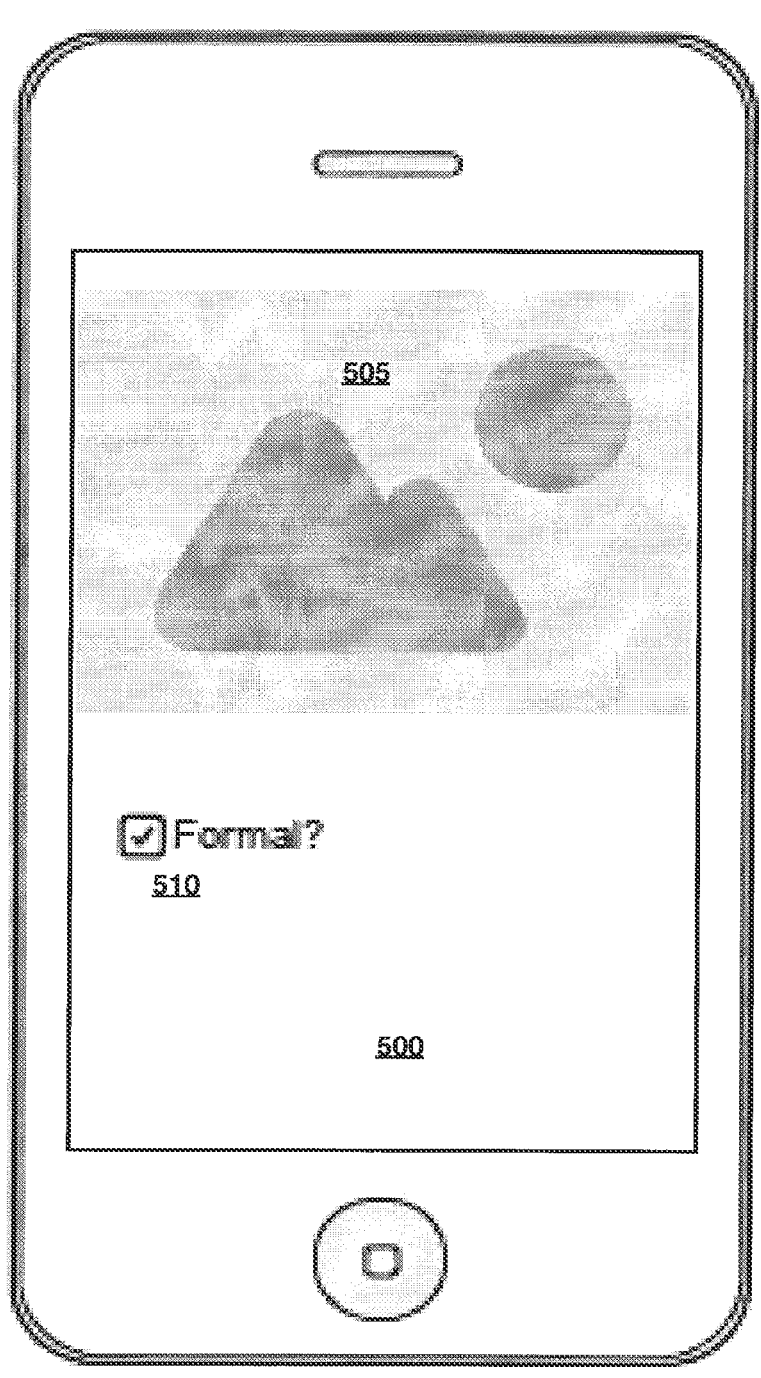
FIG. 5 illustrates a user interface that allows a user to select an automatically determined event criterion from analyzing the color and pattern of an article of clothing.
Figure 6:
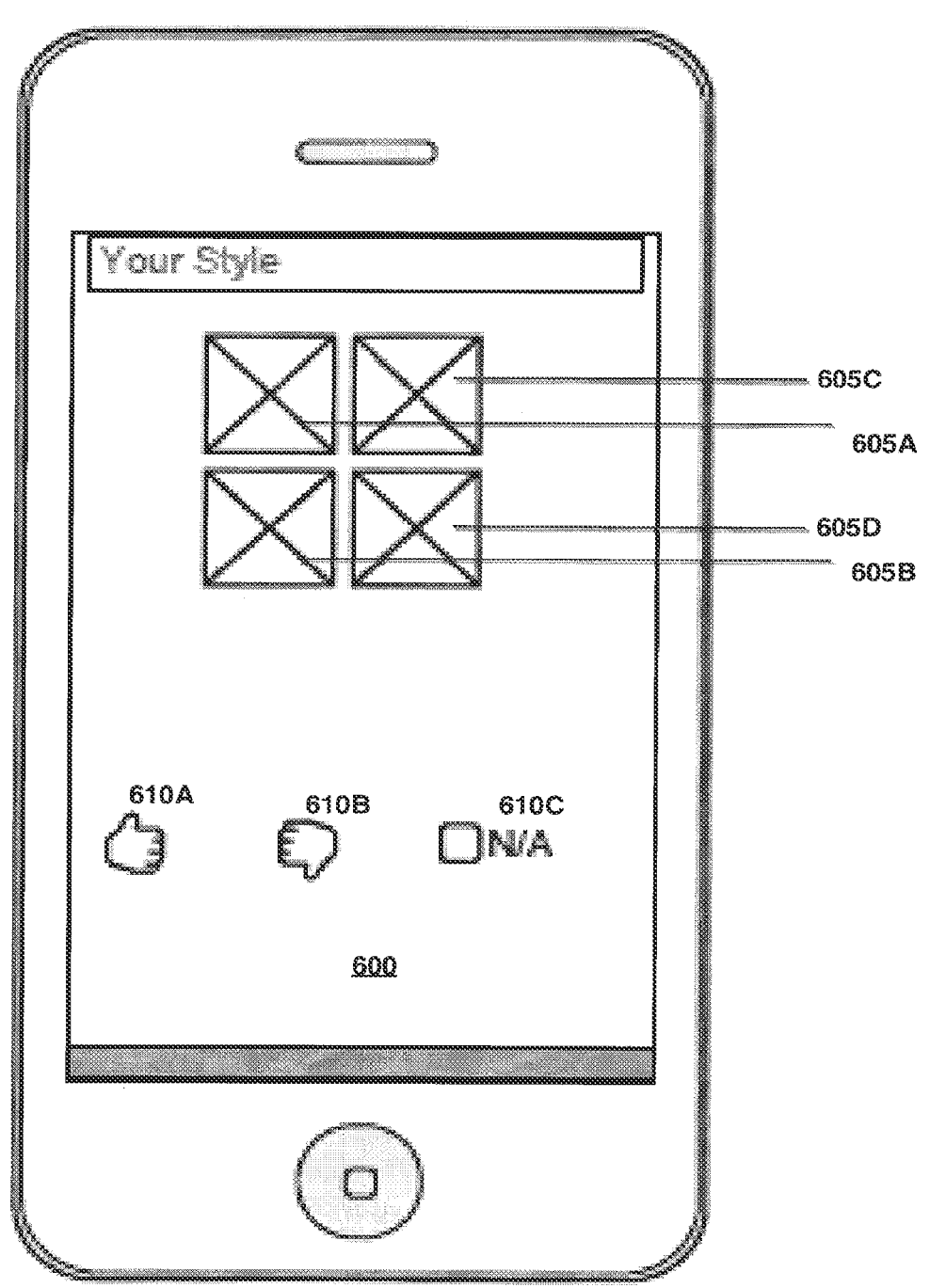
FIG. 6 illustrates a user interface that allows a user to review a plurality of possible matches of articles of clothing, as well as approve or disapprove the possible matches.

FIGS. 3-6 are example UIs that allow an end user to interact with the app 150 on their user device 105 for use in implementing at least some method embodiments described herein. FIG. 3 is a UI 300 of that includes a photograph or image 305 of an article of clothing. FIG. 4 is a UI 400 that includes event criterion such as formal 405, after five 410, casual 415, and favorites 420. These criterion are provided as selectable buttons. FIG. 5 is a UI 500 that displays an automatic event categorization for an image of an article of clothing 505. The user can select this automatic categorization by using a check box 510. FIG. 6 is a UI 600 that displays a plurality of matched articles of clothing 605A-D, as well as icons 610A and B that allow the user to approve or disapprove the possible matched articles. For example, the icons 610A and B can include thumb up and thumb down representations, respectively. A check box 610C can be used to indicate that the selection is irrelevant or that the user is agnostic to the choices.

FIG. 7 is a flow chart of an example method for performing a color and pattern match between two or more articles of clothing. For context, the articles of clothing that are to be matched have been processed using the methods described above to create both color and pattern information.

Using the color and pattern information, the method includes obtaining 705 color and pattern information for a first article of clothing. Next, the method includes locating a second article of clothing for pairing with the first article of clothing by first obtaining 710 a plurality of possible matching articles of clothing from a database, such as a virtual wardrobe. It is noteworthy that each for the plurality of possible matching articles comprising color and pattern information.

Next, the method includes calculating 715 a set of probability values that corresponding to possible matches between the color and pattern information of the first article of clothing and the color and pattern information of each of the plurality of possible matching articles. The set of probability values each having a unique range of values measured in increments from a first of the set of probability values to a last of the set of probability values. Thus, if there are three possible matches, there will be three probability values. The first probability value range is between zero and its probability value. The second probability value range is between the probability value of the first match and a total of the probability value of the first match plus the probability value of the second match. The third probability value range is between the total of the probability value of the first match plus the probability value of the second match and a sum of all three probability values.

Next, the method comprises calculating 720 a sum of the probability values.

The method randomly selects one of the articles of clothing by selecting 725 a random number between zero and the sum of the probability values. The method then includes selecting 730 one of the plurality of possible matching articles of clothing based on a match between the random number and one of the unique range of values. For example, if the random number falls in the second probability value range, the second article of clothing is selected.

The method includes displaying the one of the plurality of possible matching articles of clothing to the user, which in this example is the second article of clothing.

The method can include an optional step of receiving 735 feedback from the user regarding the potential match and updating 740 the probability calculation in response to positive or negative feedback to optimize future matching scenarios.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 37 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 35 (also referred to as disk drive unit), a signal generation device 40 (e.g., a speaker), and a network interface device 45. The computer system 1 may further include a data encryption module (not shown) to encrypt data.

The drive unit 35 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

For purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the described embodiments of the invention are illustrative only and that modifications thereof may occur to those skilled in the art. Accordingly, this invention is not to be regarded as limited to the embodiments disclosed, but is to be limited only as defined by the appended claims herein. It will further be understood that any features described in relation to any particular embodiment may be featured in combinations with other embodiments, for avoidance of doubt.

REFERENCES (INCORPORATED HEREIN BY REFERENCE)

Not Applicable

What is claimed is:

1. A non-transitory, computer-readable medium comprising program instructions for providing clothing recommendations, the program instructions, when executed by one or more processors of a computer system, cause the one or more processors to:

receive at least one captured image of at least one article of clothing from a physical wardrobe of a user;

generate, from the received captured image(s) a virtual wardrobe comprising the article(s) of clothing, the article(s) of clothing comprising color information and pattern information;

receive a first image of a first article of clothing in the virtual wardrobe;

analyze pixels of the received first image of the first article of clothing to obtain color and pattern information corresponding to the first article of clothing, wherein the pixels of the received first image are analyzed by:

extracting image segmentation information from the pixels of the received first image, wherein extracting image segmentation information from the pixels of the received first image includes locating and categorizing individual pixels and super-pixels;

locate a second article of clothing in for pairing with the first article of clothing to create a matched pair of articles of clothing, wherein the second article of clothing is located by:

obtaining a plurality of possible matching articles of clothing from one or more databases, identifying, for each of the plurality of possible matching articles of clothing, at least one of color or pattern information; and selecting the second article of clothing from the plurality of possible matching articles of clothing based on the color and pattern information corresponding to the first article of clothing and the at least one of color or pattern information corresponding to one or more of the plurality of possible matching articles of clothing, the color and pattern information corresponding to the first article of clothing being obtained from said analyzed pixels of the received first image;

provide a description of at least the second article of clothing in the matched pair of articles of clothing;

provide, in association with the description of at least the second article of clothing in the matched pair of articles of clothing, a selectable feedback object that allows for input of feedback regarding the selection of at least the second article of clothing in the matched pair of articles of clothing;

receive the feedback regarding the matched pair of articles of clothing; and modify, based on the feedback, future selections of matched articles of clothing.

2. The non-transitory, computer-readable medium of claim 1, wherein the program instructions to modify the future selections of matched articles of clothing comprises program instructions that that, when executed by the one or more processors of the computer system, cause the one or more processors to:

select, based on the feedback, a third article of clothing for pairing with the first article of clothing to create the matched pair of articles of clothing;

provide a description of at least the third article of clothing in the matched pair of articles of clothing; and provide, in association with the description of at least the third article of clothing in the matched pair of articles of clothing, a selectable feedback object that allows for input of feedback regarding the selection at the third article of clothing in the matched pair of articles of clothing.

3. The non-transitory, computer-readable medium of claim 1, wherein the first article of clothing and the second article of clothing are of a different type so as to comprise an outfit.

4. The non-transitory, computer-readable medium of claim 1, wherein the description of at least the second article of clothing in the matched pair of articles of clothing further includes a description of the first article of clothing.

5. The non-transitory, computer-readable medium of claim 1, further comprising program instructions that, when executed by the one or more processors of the computer system, cause the one or more processors to generate a recommendation for purchasing an article of clothing in response to user input.

6. The non-transitory, computer-readable medium of claim 1, wherein the selectable feedback object allows for input of positive and negative feedback regarding the selection of the second article of clothing.

7. The non-transitory, computer-readable medium of claim 1, further comprising program instructions that, when executed by the one or more processors of the computer system, cause the one or more processors to:

obtain the color information corresponding to the first article of clothing by:

performing a color space conversion of the first image of the first article of clothing;

performing color recognition of the color space converted image to obtain color information;

extracting image segmentation information for the first image that identifies image segments;

for each identified image segment, obtaining dominant color information by performing a focusing region selection of the color information of an image segment; and calculating an average of the dominant color information for the identified image segments.

8. A system comprising:

a user device configured to receive user input; and a server configured to provide one or more applications for providing clothing recommendations, the one or more applications comprising program instructions that, when executed by one or more processors, cause the one or more processors to:

receive at least one captured image of at least one article of clothing from a physical wardrobe of a user;

generate, from the received captured image(s) a virtual wardrobe comprising the article(s) of clothing, the article(s) of clothing comprising color information and pattern information;

receive a first image of a first article of clothing of clothing in the virtual wardrobe;

analyze pixels of the received first image of the first article of clothing to obtain color and pattern information corresponding to the first article of clothing, wherein the pixels of the received first image are analyzed by:

extracting image segmentation information from the pixels of the received first image, wherein extracting image segmentation information from the pixels of the received first image includes locating and categorizing individual pixels and super-pixels;

locate a second article of clothing for pairing with the first article of clothing to create a matched pair of articles of clothing, wherein the second article of clothing is located by:

obtaining a plurality of possible matching articles of clothing from one or more databases, identifying, for each of the plurality of possible matching articles of clothing, at least one of color or pattern information; and selecting the second article of clothing from the plurality of possible matching articles of clothing based on the color and pattern information corresponding to the first article of clothing and the at least one of color or pattern information corresponding to one or more of the plurality of possible matching articles of clothing, the color and pattern information corresponding to the first article of clothing being obtained from said analyzed pixels of the received first image;

provide a description of at least the second article of clothing in the matched pair of articles of clothing;

provide, in association with the description of at least the second article of clothing in the matched pair of articles of clothing, a selectable feedback object that allows for input of feedback regarding the selection of at least the second article of clothing in the matched pair of articles of clothing;

receive the feedback regarding the matched pair of articles of clothing; and modify, based on the feedback, future selections of matched articles of clothing.

9. The system of claim 8, wherein the program instructions to modify the future selections of matched articles of clothing comprises program instructions that that, when executed by the one or more processors, cause the one or more processors to:

select, based on the feedback, a third article of clothing for pairing with the first article of clothing to create the matched pair of articles of clothing;

provide a description of at least the third article of clothing in the matched pair of articles of clothing; and provide, in association with the description of at least the third article of clothing in the matched pair of articles of clothing, a selectable feedback object that allows for input of feedback regarding the selection at the third article of clothing in the matched pair of articles of clothing.

10. The system of claim 8, wherein the description of at least the second article of clothing in the matched pair of articles of clothing further includes a description of the first article of clothing.

11. The system of claim 8, wherein the first article of clothing and the second article of clothing are of a different type so as to comprise an outfit.

12. The system of claim 8, wherein the one or more applications further comprise program instructions that, when executed by the one or more processors, cause the one or more processors to generate a recommendation for purchasing an article of clothing in response to the user input into the user device.

13. The system of claim 8, wherein the selectable feedback object allows for input of positive and negative feedback regarding the selection of the second article of clothing.

14. The system of claim 8, wherein the one or more applications further comprise program instructions that, when executed by one or more processors, cause the one or more processors to:

obtain the color information corresponding to the first article of clothing by:

performing a color space conversion of the first image of the first article of clothing;

performing color recognition of the color space converted image to obtain color information;

extracting image segmentation information for the first image that identifies image segments;

for each identified image segment, obtaining dominant color information by performing a focusing region selection of the color information of an image segment; and calculating an average of the dominant color information for the identified image segments.

15. A method for providing clothing recommendations, the method comprising:

generating, from the received captured image(s) a virtual wardrobe comprising the article(s) of clothing, the article(s) of clothing comprising color information and pattern information;

receiving at least one captured image of at least one article of clothing from a physical wardrobe of a user;

receiving a first image of a first article of clothing in the virtual wardrobe;

analyzing pixels of the received first image of the first article of clothing to obtain color and pattern information corresponding to the first article of clothing, wherein the pixels of the received first image are analyzed by:

extracting image segmentation information from the pixels of the received first image, wherein extracting image segmentation information from the pixels of the received first image includes locating and categorizing individual pixels and super-pixels;

locating a second article of clothing for pairing with the first article of clothing to create a matched pair of articles of clothing, wherein the second article of clothing is located by:

obtaining a plurality of possible matching articles of clothing from one or more databases, identifying, for each of the plurality of possible matching articles of clothing, at least one of color or pattern information; and selecting the second article of clothing from the plurality of possible matching articles of clothing based on the color and pattern information corresponding to the first article of clothing and the at least one of color or pattern information corresponding to one or more of the plurality of possible matching articles of clothing, the color and pattern information corresponding to the first article of clothing being obtained from said analyzed pixels of the received first image;

providing a description of at least the second article of clothing in the matched pair of articles of clothing;

providing, in association with the description of at least the second article of clothing in the matched pair of articles of clothing, a selectable feedback object that allows for input of feedback regarding the selection of at least the second article of clothing in the matched pair of articles of clothing;

receiving the feedback regarding the matched pair of articles of clothing; and modifying, based on the feedback, future selections of matched articles of clothing.

16. The method of claim 15, wherein modifying the future selections of matched articles of clothing comprises:

selecting, based on the feedback, a third article of clothing for pairing with the first article of clothing to create the matched pair of articles of clothing;

providing a description of at least the third article of clothing in the matched pair of articles of clothing; and providing, in association with the description of at least the third article of clothing in the matched pair of articles of clothing, a selectable feedback object that allows for input of feedback regarding the selection at the third article of clothing in the matched pair of articles of clothing.

17. The method of claim 15, wherein the first article of clothing and the second article of clothing are of a different type so as to comprise an outfit.

18. The method of claim 15, wherein the description of at least the second article of clothing in the matched pair of articles of clothing further includes a description of the first article of clothing.

19. The method of claim 15, further comprising generating a recommendation for purchasing an article of clothing in response to user input.

20. The method of claim 15, wherein the selectable feedback object allows for input of positive and negative feedback regarding the selection of the second article of clothing.

* * * * *